(12) United States Patent
Li

(10) Patent No.: US 9,247,201 B2
(45) Date of Patent: Jan. 26, 2016

(54) METHODS AND SYSTEMS FOR REALIZING INTERACTION BETWEEN VIDEO INPUT AND VIRTUAL NETWORK SCENE

(75) Inventor: Zhuanke Li, Shenzhen (CN)

(73) Assignee: Tencent Holdings Limited, Shenzhen (CN)

( * ) Notice: Subject to any disclaimer, the term of this patent is extended or adjusted under 35 U.S.C. 154(b) by 1037 days.

(21) Appl. No.: 12/648,209

(22) Filed: Dec. 28, 2009

(65) Prior Publication Data

US 2010/0322111 A1   Dec. 23, 2010

(30) Foreign Application Priority Data

Jun. 23, 2009   (CN) .......................... 2009 1 0150595

(51) Int. Cl.
| | |
|---|---|
| *G06F 17/00* | (2006.01) |
| *G06T 1/00* | (2006.01) |
| *H04N 7/15* | (2006.01) |
| *A63F 13/30* | (2014.01) |
| *H04L 12/18* | (2006.01) |
| *H04N 7/14* | (2006.01) |
| *H04N 21/422* | (2011.01) |
| *H04N 21/4223* | (2011.01) |

(Continued)

(52) U.S. Cl.
CPC *H04N 7/15* (2013.01); *A63F 13/12* (2013.01); *H04L 12/1822* (2013.01); *H04N 7/147* (2013.01); *H04N 21/4223* (2013.01); *H04N 21/42203* (2013.01); *H04N 21/4781* (2013.01); *H04N 21/4788* (2013.01); *A63F 2300/1093* (2013.01); *A63F 2300/408* (2013.01); *A63F 2300/577* (2013.01); *A63F 2300/6045* (2013.01); *A63F 2300/695* (2013.01); *H04N 7/157* (2013.01)

(58) Field of Classification Search
CPC .......... G06T 13/40; G06T 19/006; G06T 7/00
See application file for complete search history.

(56) References Cited

U.S. PATENT DOCUMENTS

| | | | |
|---|---|---|---|
| 6,124,862 A | 9/2000 | Boyken et al. | |
| 6,278,466 B1 | 8/2001 | Chen | |
| 6,414,707 B1 * | 7/2002 | Agraharam et al. | ....... 348/14.07 |

(Continued)

FOREIGN PATENT DOCUMENTS

| | | |
|---|---|---|
| CN | 1606347 A | 4/2005 |
| CN | 101068314 A | 11/2007 |

(Continued)

OTHER PUBLICATIONS

Patent Cooperation Treaty, International Search Report for related PCT/CN2010/072993, mailed Aug. 26, 2010.

(Continued)

*Primary Examiner* — Ming Hon
*Assistant Examiner* — Phong Nguyen
(74) *Attorney, Agent, or Firm* — Jones Day

(57) ABSTRACT

Method and system for realizing an interaction between a video input and a virtual network scene. The method includes receiving input video data for a first user at a first terminal, sending information associated with the input video data through a network to at least a second terminal, processing information associated with the input video data, and displaying a video on or embedded with a virtual network scene at least the first terminal and the second terminal. The process for displaying includes generating the video based on at least information associated with the input video data.

8 Claims, 6 Drawing Sheets

(51) Int. Cl.
*H04N 21/478* (2011.01)
*H04N 21/4788* (2011.01)

(56) References Cited

U.S. PATENT DOCUMENTS

| | | | |
|---|---|---|---|
| 8,601,379 | B2 | 12/2013 | Marks et al. |
| 2003/0006957 | A1 | 1/2003 | Colantonio et al. |
| 2004/0048233 | A1 | 3/2004 | Matthews et al. |
| 2004/0165665 | A1 | 8/2004 | Harumoto et al. |
| 2004/0260823 | A1 | 12/2004 | Tiwari et al. |
| 2005/0071435 | A1 | 3/2005 | Karstens |
| 2006/0092178 | A1 | 5/2006 | Tanguay, Jr. et al. |
| 2006/0155642 | A1 | 7/2006 | Pettersen |
| 2006/0210165 | A1* | 9/2006 | Takemoto et al. ............ 382/190 |
| 2006/0215017 | A1 | 9/2006 | Cohen et al. |
| 2006/0251383 | A1 | 11/2006 | Vronay et al. |
| 2007/0242066 | A1 | 10/2007 | Levy Rosenthal |
| 2008/0088698 | A1* | 4/2008 | Patel et al. ................. 348/14.09 |
| 2008/0100620 | A1* | 5/2008 | Nagai et al. ................... 345/424 |
| 2008/0141282 | A1 | 6/2008 | Elber et al. |
| 2008/0227546 | A1* | 9/2008 | Roberts ........................... 463/38 |
| 2009/0079816 | A1* | 3/2009 | Qvarfordt et al. .......... 348/14.16 |
| 2009/0098939 | A1* | 4/2009 | Hamilton et al. ............... 463/42 |
| 2009/0182889 | A1 | 7/2009 | Hurst et al. |
| 2009/0245747 | A1* | 10/2009 | Beyabani ........................ 386/46 |
| 2009/0315974 | A1* | 12/2009 | Matthews ................. 348/14.08 |
| 2010/0064010 | A1* | 3/2010 | Alkov et al. .................. 709/206 |
| 2010/0295771 | A1* | 11/2010 | Burton et al. ................. 345/156 |

FOREIGN PATENT DOCUMENTS

| | | |
|---|---|---|
| CN | 101079998 A | 11/2007 |
| CN | 101098241 A | 1/2008 |
| CN | 101219029 A | 7/2008 |
| CN | 101350845 A | 1/2009 |
| JP | 09107534 A | 4/1997 |
| JP | 2000115521 A | 4/2000 |
| JP | 2002007294 A | 1/2002 |
| KR | 100651206 B1 | 12/2006 |
| KR | 20070080542 A | 8/2007 |
| KR | 20030021197 A | 3/2012 |
| RU | 2284571 C1 | 9/2006 |
| WO | WO 2008-098839 A1 | 8/2008 |
| WO | WO 2008/139251 | 11/2008 |

OTHER PUBLICATIONS

Patent Cooperation Treaty, Written Opinion of the International Searching Authority for related PCT/CN2010/072993, mailed Aug. 26, 2010.
United States Patent and Trademark Office, Office Action for related U.S. Appl. No. 13/334,765, mailed on Jul. 27, 2012.
United States Patent and Trademark Office, Office Action for related U.S. Appl. No. 13/334,765, mailed on Jan. 16, 2013.
Chinese Patent Office, Office Action issued in related Chinese Application 200910150595.8, mailed Apr. 23, 2013.
Russian Patent Office, Office Action (with English translation attached) issued in related Russian Application 2012101502/08(002044), mailed Apr. 17, 2013.
De Haan et al., "Egocentric Navigation for Video Surveillance in 3D Virtual Environments," *IEEE Symposium on 3D User Interfaces*, 2009.
European Patent Office, Communication with extended European Search Report, mailed Jan. 8, 2014, in EP Application 10791354.3.
United States Patent and Trademark Office, Office Action mailed Jun. 10, 2014, in U.S. Appl. No. 13/334,765.
United States Patent and Trademark Office, Office Action mailed Dec. 1, 2014, in U.S. Appl. No. 13/334,765.

* cited by examiner

METHODS AND SYSTEMS FOR REALIZING INTERACTION BETWEEN VIDEO INPUT AND VIRTUAL NETWORK SCENE

1. CROSS-REFERENCES TO RELATED APPLICATIONS

This application claims priority to Chinese Patent Application No. 200910150595.8, filed Jun. 23, 2009, incorporated by reference herein for all purposes.

2. BACKGROUND OF THE INVENTION

The present invention is directed to computer network technology. More particularly, the invention provides methods and systems for realizing interaction between video input and virtual network scene. Merely by way of example, the invention has been applied to an on-line game. But it would be recognized that the invention has a much broader range of applicability.

Along with rapid development of the Internet, users can work online or enjoy entertainment and other services online. In order to enhance user experience and expand the scope of internet services, conventional technology can provide a mode of virtual network scene. For example, in a multi-user network game, users can have a realistic feeling through a virtual scene of the game, which can improve the user experience and the user satisfaction with the network service. For example, applications of the virtual network scene include but are not restricted to online games and videoconference.

But in conventional technology, the network service may provide users only the interactions limited in a virtual scene. Hence it is highly desirable to improve techniques for network services.

3. BRIEF SUMMARY OF THE INVENTION

The present invention is directed to computer network technology. More particularly, the invention provides methods and systems for realizing interaction between video input and virtual network scene. Merely by way of example, the invention has been applied to an on-line game. But it would be recognized that the invention has a much broader range of applicability.

Embodiments of the present invention provide methods and systems for realizing interaction between video input and virtual network scene, which increase the relevancy between the video input and the network service of virtual network scene, realize the interaction between the video input and the network service mentioned above, enhance the user experience.

According to one embodiment, a method for realizing an interaction between a video input and a virtual network scene is disclosed. The method includes: receiving input video data for a first user at a first terminal; sending information associated with the input video data through a network to at least a second terminal; processing information associated with the input video data; and displaying a video on or embedded with a virtual network scene at least the first terminal and the second terminal; wherein the process for displaying includes generating the video based on at least information associated with the processed input video data.

For example, the process for processing information associated with the input video data includes: extracting movement information for the first user based on the input video data; and integrating the movement information with the virtual network scene in order to realize an interaction between the input video data and the virtual network scene.

In another example, the process for extracting movement information includes: extracting first video data associated with a face of the first user from the input video data; recognizing least a facial movement for the first user based on at least information associated with the first video data; and/or extracting second video data associated with a body of the first user from the input video data; recognizing at least a body movement for the first user based on at least information associated with the second video data. The first video data associated with a face of the first user can be extracted by using facial recognition technique. The second video data associated with a body of the first user can be extracted by using motion analysis and object tracking technique.

In yet another example, the process for integrating the movement information with the virtual network scene includes: mapping the movement information for the first user to a virtual character corresponding to the first user based on at least information associated with a mapping relationship between the movement information for the first user and the corresponding virtual character; and/or determining the virtual network scene based on at least information associated with the movement information for the first user.

According to another embodiment, the method further comprising: determining at a predetermined time whether the input video data satisfy one or more predetermined conditions; if the one or more predetermined conditions are determined to be satisfied, providing the first user with an positive feedback; and if the one or more predetermined conditions are determined not to be satisfied, providing the first user with a negative feedback. For example, the process for determining at a predetermined time whether the input video data satisfy one or more predetermined conditions includes: determining whether the input video data include first video data associated with a face of the first user; and if the input video data are determined to include the first video data, the input video data are determined to satisfy the one or more predetermined conditions.

According to yet another embodiment, the method further comprising: determining a time period when one or more images for the face of the first user are captured in the input video data; providing the first user with a positive feedback or a negative feedback, based on at least information associated with the time period; and/or determining a value corresponding to a predetermined characteristic associated with the face of the first user based on at least information associated with the input video data; and providing the first user with a positive feedback or a negative feedback based on at least information associated with the determined value. For example, the process for providing the first user with a positive feedback includes providing the first user with one or more rewards; and the process for providing the first user with a negative feedback includes providing the first user with one or more penalties.

According to yet another embodiment, the method further comprising: receiving a signal from the first user for adding a virtual object; selecting the virtual object based on at least information associated with the signal; and displaying the selected virtual object at least the first terminal. Further, the process for displaying the selected virtual object includes changing a position of the selected virtual object if a position for a face of the first user changes.

According to yet another embodiment, the method further comprising: receiving a trigger signal from the first user; in response to the trigger signal, taking at least two screenshots for at least two videos associated with at least two users respectively, the two videos being displayed at the first terminal, the two screenshots including information associated with two faces of the two users respectively; determining a matching degree between the two screenshots; and providing the determined matching degree to the first user.

According to yet another embodiment of the present invention, an apparatus or system for realizing the interaction between video input and virtual network scene is disclosed. The apparatus or system is configured to receive input video data for a first user at a first terminal; send information associated with the input video data through a network to at least a second terminal; process information associated with the input video data; and display a video on or embedded with a virtual network scene at least the first terminal; wherein the video is generated based on at least information associated with the processed input video data.

For example, the apparatus or system comprising: collecting module, configured to receive input video data for a first user at a first terminal; recognizing module, configured to extract movement information for the first user based on the input video data; interacting module, configured to integrate the movement information with the virtual network scene in order to realize an interaction between the input video data and the virtual network scene.

For example, wherein the recognizing module comprising: first recognizing unit, configured to extract first video data associated with a face of the first user from the input video data and to recognize at least a facial movement for the first user based on at least information associated with the first video data; and/or second recognizing unit, configured to extract second video data associated with a body of the first user from the input video data, and to recognize at least a body movement for the first user based on at least information associated with the second video data.

In another example, wherein the interacting module comprising a mapping unit configured to map the movement information for the first user to a virtual character corresponding to the first user based on at least information associated with a mapping relationship between the movement information for the first user and the corresponding virtual character the real user, and/or, a controlling unit configured to determine the virtual network scene based on at least information associated with the movement information for the first user.

In yet another example, the apparatus or system further comprising: a first judging and feedback module configured to determine at a predetermined time whether the input video data satisfy one or more predetermined conditions, if the one or more predetermined conditions are determined to be satisfied, provide the first user with an positive feedback, and if the one or more predetermined conditions are determined not to be satisfied, provide the first user with a negative feedback.

In yet another example, the apparatus or system further comprising: a second judging and feedback module configured to determine a time period when one or more images for the face of the first user are captured in the input video data and to provide the first user with a positive feedback or a negative feedback based on at least information associated with the time period, and/or, a third judging and feedback module configured to determine a value corresponding to a predetermined characteristic associated with the face of the first user based on at least information associated with the input video data and to provide the first user with a positive feedback or a negative feedback based on at least information associated with the determined value.

According to yet another embodiment, the apparatus or system further comprising: a receiving module configured to receive a signal from the first user for adding a virtual object; a selecting module configured to select the virtual object based on at least information associated with the signal; a display module configured to display the selected virtual object at least the first terminal and the second terminal. The display module is further configured to change a position of the selected virtual object if a position for a face of the first user changes.

According to yet another embodiment, the apparatus or system further comprising: a screenshot module configured to receive a trigger signal from the first user, and in response to the trigger signal, take at least two screenshots for at least two videos associated with at least two users respectively, the two videos being displayed at the first terminal, the two screenshots including information associated with two faces of the two users respectively, a comparison module configured to determine a matching degree between the two screenshots and to provide the determined matching degree to the first user.

According to yet another embodiment, a system for realizing the interaction between video input and virtual network scene is disclosed. The system includes a network server; and a plurality of client terminals including a first client terminal and a second client terminal, wherein the first client terminal is at least configured to: receive input video data for a first user at the first client terminal, send information associated with the input video data through the server to at least the second client terminal; extract movement information for the first user based on the input video data; and integrate the movement information with a virtual network scene, display a video on or embedded with the virtual network scene at the first client terminal, wherein the client terminals are at least configured to display the video on or embedded with the virtual network scene, the network server is at least configured to receive from the first client terminal and transmit to the second client terminal information associated with the input video data and, control information to determine the virtual network scene, the video is generated based on at least information associated with the input video data. According to yet another embodiment, a computer program product including a computer readable medium is disclosed, it includes instructions for realizing an interaction between a video input and a virtual network scene, the computer readable medium comprising: one or more instructions for receiving input video data for a first user at a first terminal; one or more instructions for sending information associated with the input video date through a network to at least a second terminal; one or more instructions for processing information associated with the input video data; and one or more instructions for displaying a video on or embedded with a virtual network scene at least the first terminal and the second terminal; wherein the video is generated based on at least information associated with the input video data.

According to yet another embodiment, the computer program product further comprising: one or more instructions for receiving input video data for a first user at a first terminal; one or more instructions for extracting movement information for the first user based on the input video data; one or more instructions for integrating the movement information with the virtual network scene in order to realize an interaction between the input video data and the virtual network scene.

According to yet another embodiment, the computer program product further comprising: one or more instructions for extracting first video data associated with a face of the first user from the input video data; one or more instructions for recognizing at least a facial movement for the first user based on at least information associated with the first video data;

and/or one or more instructions for extracting second video data associated with a body of the first user from the input video data; one or more instructions for recognizing at least a body movement for the first user based on at least information associated with the second video data.

According to yet another embodiment, the computer program product further comprising: one or more instructions for mapping the movement information for the first user to a virtual character corresponding to the first user based on at least information associated with a mapping relationship between the movement information for the first user and the corresponding virtual character, one or more instructions for determining the virtual network scene based on at least information associated with the movement information for the first user.

For example, by recognizing the movement information of the current user and integrating the movement information of current user with virtual network scene, certain embodiments of the present invention increases the relevancy between the video input and the network service of virtual network scene, realizes the interaction between the video input and the network service mentioned above, and/or enhances the user experience.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Figure 1:
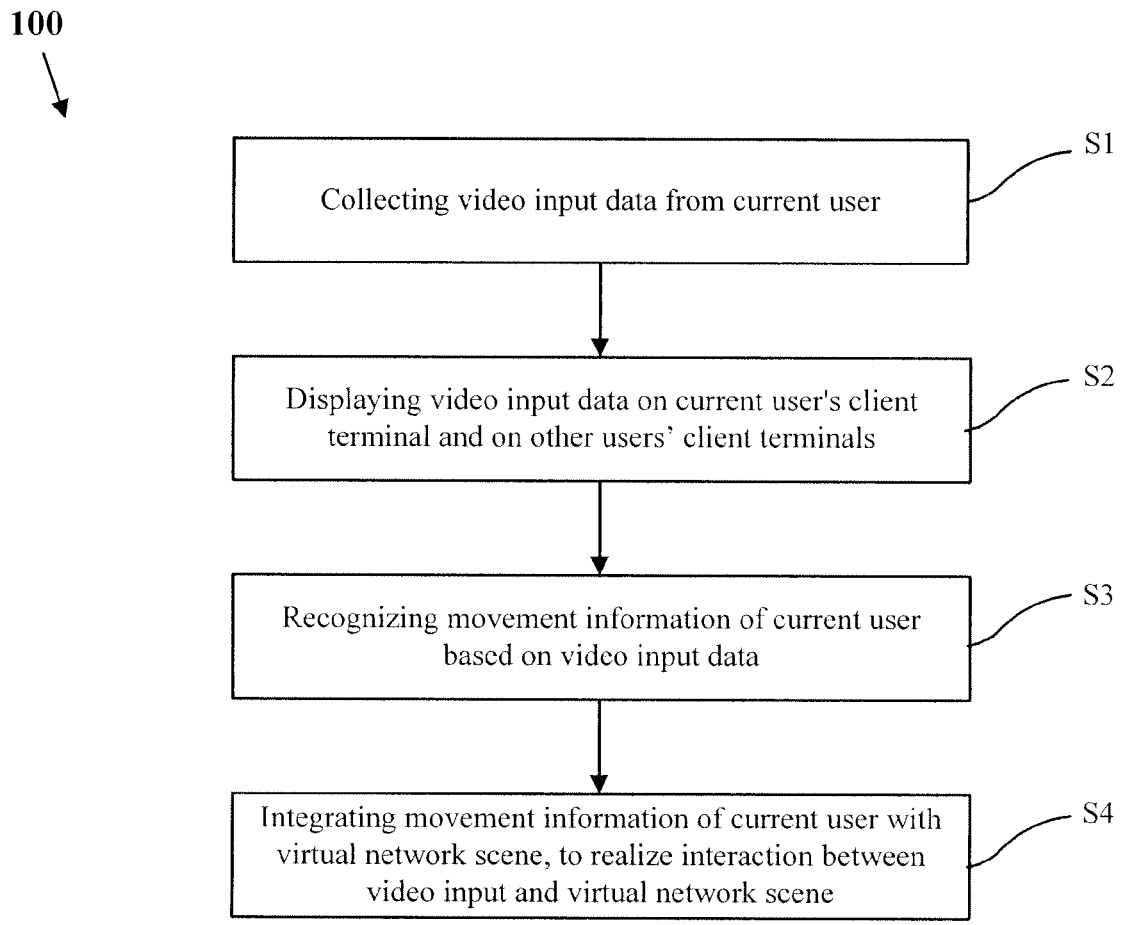
FIG. 1 is a simplified flowchart showing a method for realizing an interaction between a video input and a virtual network scene according to an embodiment of the present invention.

The present invention is directed to computer network technology. More particularly, the invention provides methods and systems for realizing interaction between video input and virtual network scene. Merely by way of example, the invention has been applied to an on-line game. But it would be recognized that the invention has a much broader range of applicability.

In conventional technology, the network service may provide users only the interactions limited in a virtual scene. Such limitation may cause the difficulty for the users' sensory experiences to interact with the virtual network scene, and thus may also degrade the user experience.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

According to certain embodiments, the terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

According to some embodiments, when an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

According to some embodiments, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In order to increase the relevancy between the video input and the network service of virtual network scene, realize the interaction between the video input and the network service mentioned above, and/or enhance the user experience, one embodiment of the present invention discloses a method for realizing the interaction between video input and virtual network scene. For example, the method includes: collecting input video data from user; displaying a video embedded with the virtual network scene at the user's client terminal, wherein the video is generated based on at least information associated with the input video data collected for the current user; or displaying the video and the virtual network scene at the user's client terminal, wherein the video is generated based on at least information associated with the input video data collected for the current user. In another example, the process for displaying the video embedded with the virtual network scene at the user's client terminal refers to, at least in part, that the video is integrated with the virtual network scene. In yet another example, the process for displaying the video and the virtual network scene on the user's client terminal refers to, at least in part, that the video floats over the virtual network scene. In one embodiment, the virtual network scene includes, without limitation, a scene for an online game and/or a scene for a videoconference.

FIG. 1 is a simplified flowchart showing a method for realizing an interaction between video input and virtual network scene according to an embodiment of the present invention. This diagram is merely an example, which should not unduly limit the scope of the claims. One of ordinary skill in the art would recognize many variations, alternatives, and modifications.

As shown in FIG. 1, the method 100 includes the following processes:

S1: Receiving input video data for a first user at a first terminal;

S2: Sending information associated with the input video data through a network to at least a second terminal;

S3: Processing information associated with the input video data; and

S4: Displaying a video on or embedded with a virtual network scene at least the first terminal; wherein the process for displaying includes generating the video based on at least information associated with the processed input video data.

In one embodiment, the process S3 further includes:

S3A: Extracting movement information for the first user based on the input video data; and S3B: Integrating the movement information with the virtual network scene in order to realize an interaction between the input video data and the virtual network scene.

In another embodiment, S3A further includes:

Extracting the input video data for the first user's face, based on facial recognition technique, from the input video data collected at the process S1, and recognizing the facial movement of the first user based on the extracted input video data for the first user's face; and/or Extracting the input video data for the first user's body, based on motion analysis and object tracking technique, from the input video data collected at the process 51, and recognizing the body movement of the first user based on the input video data of first user's body. For example, the facial movement includes head movement.

In yet another embodiment, S3B further includes:

Mapping the movement information for the first user to a virtual character based on the movement information of the first user and the mapping relationship between the first user and the virtual character; and/or Controlling the virtual network scene based on the movement information of the first user.

By recognizing the movement information of the first user, and integrating the movement information of the first user with the virtual network scene, certain embodiments of the present invention can improve the relevancy between the video input and the network service of virtual network scene, realize the interaction between the video input and the network service mentioned above, and/or enhances user experience.

In order to improve the relevancy between the video input and the network service of virtual network scene, realize the interaction between the video input and the network service mentioned above, and/or enhance the user experience, one embodiment of the present invention discloses a method for realizing an interaction between a video input and a virtual network scene.

Figure 2:
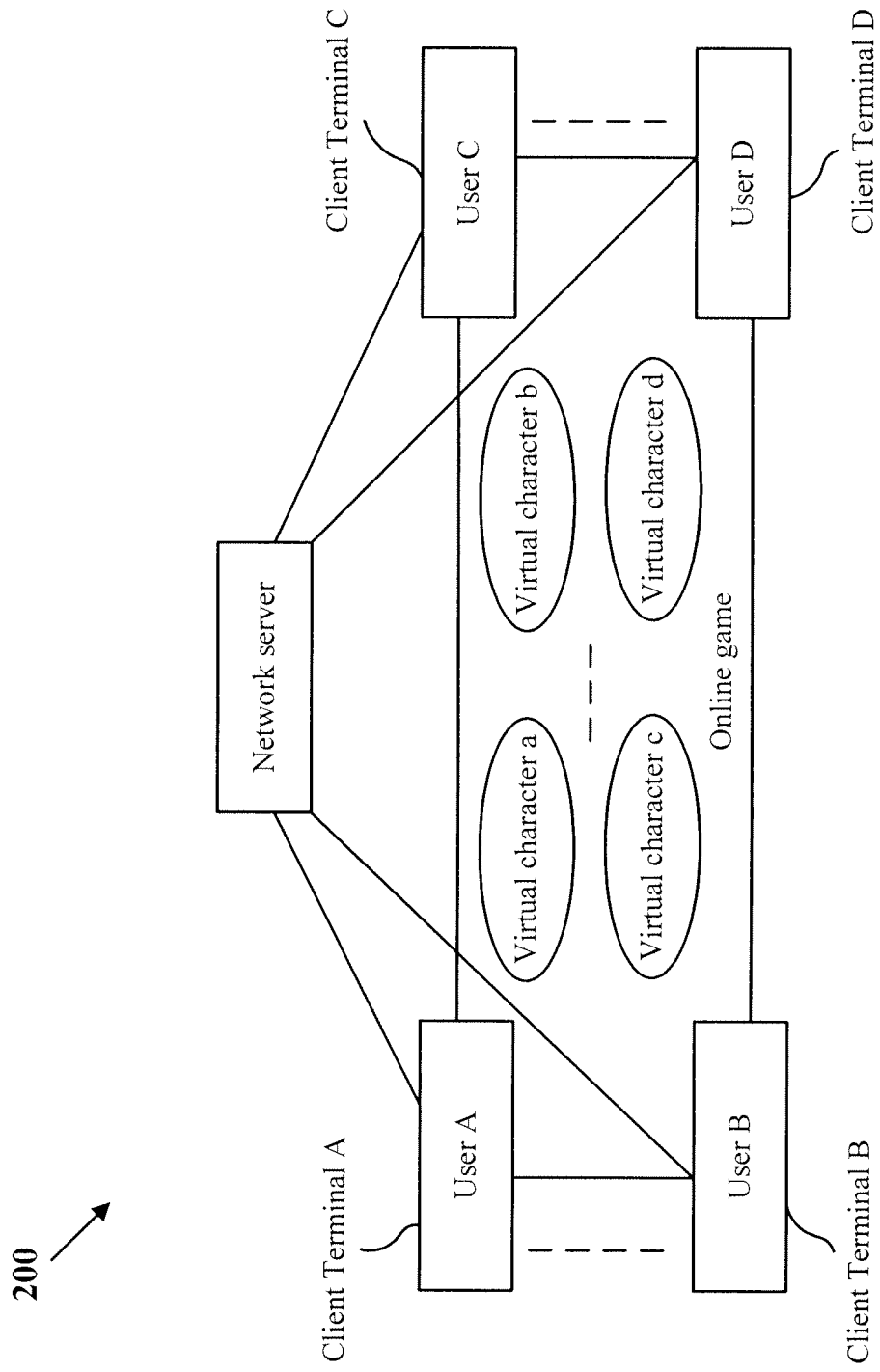
FIG. 2 is a simplified diagram showing a method 200 for realizing an interaction between a video input and a virtual network scene according to another embodiment of the present invention.

FIG. 2 is a simplified diagram showing a method 200 for realizing an interaction between a video input and a virtual network scene according to another embodiment of the present invention. This diagram is merely an example, which should not unduly limit the scope of the claims. One of ordinary skill in the art would recognize many variations, alternatives, and modifications. As shown in FIG. 2, an online game scene is used as an example for the virtual network scene. For example, there are three real-time users A, B, and C, and their respective virtual identities in the game are characters a, b, and c respectively. The user A is at a client terminal A, the user B is at a client terminal B, and the user C is at a client terminal C.

Figure 3:
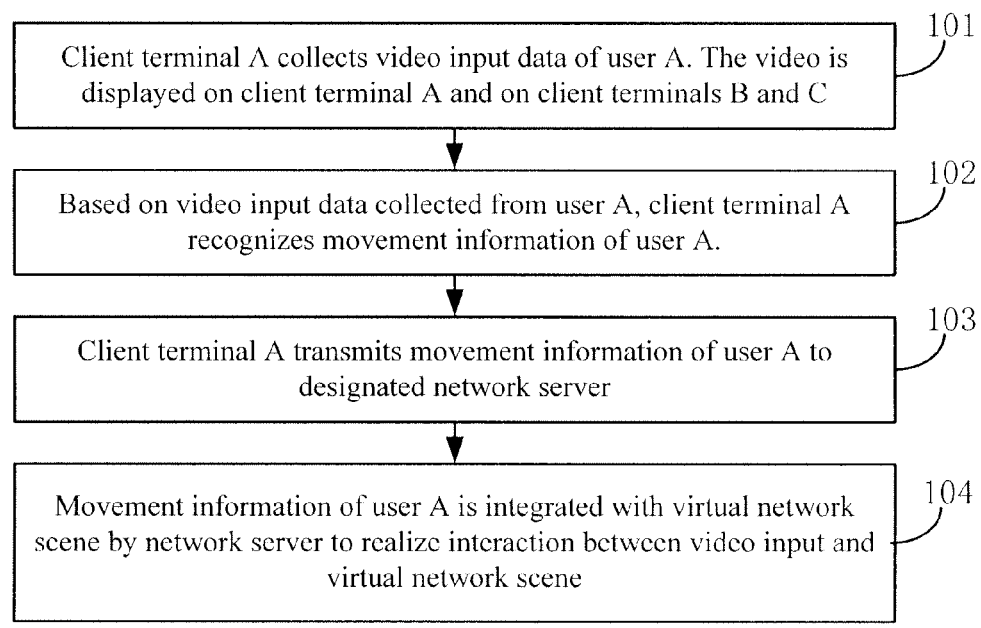
FIG. 3 is a simplified flowchart showing the method 200 for realizing the interaction between a video input and a virtual network scene according to another embodiment of the present invention.

FIG. 3 is a simplified flowchart showing the method 200 for realizing the interaction between video input and virtual network scene according to another embodiment of the present invention. This diagram is merely an example, which should not unduly limit the scope of the claims. One of ordinary skill in the art would recognize many variations, alternatives, and modifications.

As shown in FIGS. 2 and 3, the method 200 includes processes 101, 102, 103, and 104 as follows.

101: The client terminal A collects input video data for the user A. The video formed based on the collected input video data is displayed on the client terminal A, and the video can also be displayed on the client terminals B and C;

For example, the client terminal A could be a computer or a handheld terminal with a data collecting and capturing device such as a webcam or a handheld digital camera. In another example, the embodiment of the present invention makes no restriction on the data collecting methods at the client terminal A. In yet another example, the client terminal A displays the video formed based on the input video data collected from the user A, and then send the input video data to the client terminals B and C through a network server, as shown in FIG. 2. In another example, the video is displayed on or embedded with a virtual network scene.

102: Based on the input video data collected from the user A, the client terminal A extracts movement information for the user A.

For example, the input video data match with the corresponding movement of the user demonstrated in front of the data collecting device. In another example, types of movements include, without limitation, the user's facial movement and/or the user's body movement.

In one embodiment, if the user A presents his face in front of the client terminal A, the video data for the user A's face are extracted from the input video data collected from the user A, using the facial recognition technique. Additionally, the facial movement of the user A is recognized based on the video data for the user A's face.

In another embodiment, if the user A presents his body in front of the client terminal A, the video data for the user A's body are extracted from the input video data collected from the user A, using motion analysis and object tracking technique. Additionally, the body movement of the user A is recognized based on the video data for the user A's body.

103: The client terminal A transmits the movement information for the user A to a designated network server, as shown in FIG. 2.

In one embodiment, the designated network server is a video game server. The client terminal A can send the movement information for the user A to the designated network server by using data that carry the movement information. For example, for facial movement, XX1 is defined for blink and XX2 is defined for frown.

104: The movement information for the user A is integrated with a virtual network scene by the network server in order to realize the interaction between the input video data and the virtual network scene.

In one embodiment, based on the movement information for the user A, and the mapping relationship between the user A and the virtual character a in the online game (as shown in FIG. 2), the network server maps the recognized movement of the user A to the virtual character a.

According to certain embodiments, as mentioned above, the real user and the virtual character have a mapping relationship in this virtual network game scene, in order to improve the processing efficiency of the network service, referring to FIG. 2, this embodiment of the present invention assumes the existence of a network server which provides a multi-user virtual network game service. This network server stores the mapping relations mentioned above. After receiving the movement information for the user A from the client terminal A, the server maps the corresponding movement onto character a who is the virtual identity of the user A in the game. For example, if the server recognizes that the movement of the user A is blinking, which can be marked as XX1, then, character a blinks in this virtual network game. This step can be realized by a person skilled in the art through motion analysis and object tracking technique.

According to some embodiments, on the other hand, a person skilled in the art can realize that integrating the movement information for the user A with virtual network scene can be also implemented by controlling the virtual network scene based on the movement information for the current user, assuming the network server stores the mapping relations between user's movement information and the corresponding instruction for controlling the virtual network scene. For example, if the user A's movement information is waving his hand from right to left, after receiving this movement information, the server maps this movement to the corresponding instruction, which could be "hitting a ball" or pause the online game, then the online game can be controlled to show a scene of "hitting a ball" or pause the online game, etc.

Certain embodiments take for example that the client terminal A extracts the movement information for the user A based on the input video data for the user A, and sends the movement information for the user A to the server. In reality, in order to further improve the efficiency of data processing, the client terminal A can also directly send the input video data for the user A to the network server, and then the server recognizes the movement information for the user A based on the received input video data. The embodiment of the present invention has no restrictions on this. A person skilled in the art can also encode or compress the data to enhance the efficiency of network transmission, the embodiment of the present invention has no restriction on this either.

According to some embodiments, similarly, through the implementation of the above steps 101-104, the users B and C can realize the interaction between the video input and virtual network scene, resulting in improved user experience. Users can see the real look of other participants in the game. Furthermore, the client terminals can also provide users with the functions of local self-display, that is, users can also view themselves.

According to certain embodiments, further, in order to enhance user experience, the embodiments provide more methods including the following: The client terminal A receives a trigger signal from the user A; takes at least two screenshots associated with the user B and the user C respectively, for example, screenshot X for the user B and screenshot Y for the user C, wherein, the screenshot X includes the face information for the user B, the screenshot Y includes the face information for the user C; acquires the matching degree of the screenshot X and Y by calculating the matching degree of the face information for the user B and the face information for the user C. Preferably, the result of the calculation can be returned to the client terminal A to provide the user A with the matching degree, which will further increase the level of entertainment of the game.

According to some embodiments, preferably, in order to increase the relevancy of the video input and the network service of virtual network game scene, a method provided by these embodiments take input video data sample for every user at a predetermined time, and then determine if every user's input video data sample satisfy one or more desired conditions, for example, the desired condition can be if the input video data sample include video data associated with the user's face, if the one or more predetermined conditions are determined to be satisfied, the user receives an positive feedback, such as certain rewards in the games, otherwise, the user receives a negative feedback, such as certain punishments, for example, unable to perform certain actions in the game.

According to certain embodiments, in addition, a method provided by these embodiments take input video data sample for every user at a predetermined time, and then determine if every user's input video data sample satisfy one or more predetermined conditions, for example, the predetermined condition can be if the input video data sample include video data associated with the user's face, if the one or more predetermined conditions are determined to be satisfied, a value is set up for the user, and a set of rules for accumulating the values are established. A higher accumulated values means the user is more likely to show himself. As another example, if the one or more predetermined conditions are determined to be satisfied, the time period that predetermined conditions are satisfied is accumulated, for example, the predetermined condition can be if the input video data sample include video data associated with the user's face, a longer accumulated time period means the user is more inclined to show himself. Further, the current user can be offered a positive or a negative feedback, based on the accumulated values or time period.

According to some embodiments, a method provided by these embodiments can also predetermine a characteristic associated with the face of the user; determine a value corresponding to the predetermined characteristic based on the input video data, if the value is determined, the user receives a positive feedback, such as a reward in the network game; otherwise the user receives a negative feedback, such as a punishment in the game. For example, suppose the above-mentioned predetermine a characteristic is the nose, the method can determine if the value corresponding to the nose exists or not based on the captured input video of the current user's face, if the corresponding value is obtainable, then the user receives a corresponding reward in the game; otherwise the user's certain action in the game is disabled, for example, suspending the user to continue with the online game, or score penalty to the user in the game; or reminding the user to face the video capture device on the client side etc.

According to certain embodiments, preferably, in order to enhance the utility and entertainment, client terminal can also provide users with supplemental virtual objects such as graphics objects, etc. The locations of the supplemental objects change according to the location of the user's face. This matching change can be realized through the object tracking technique. For example, the user A selects glasses as his supplemental virtual object, correspondingly, the client terminal A receives the signal of the user A choosing glasses, finds the type of glasses the user A has chosen and adds the glasses in the video input window. Then in the video input window, the glasses always stay on the user's face and move with the face, no matter the user is facing down or up. The supplemental virtual objects mentioned above can be either set up in advance for the user or copied in from somewhere else by the user. The embodiment of the present invention has no restriction on this.

According to some embodiments, further, in order to enhance the utility and entertainment, the embodiment of the present invention also supports user choosing one or more favorite target video windows among available user video windows, sending expressions or action animation pictures to the target windows, to express feelings and actions that the user wants to convey. For example, the user A chooses a smiling face image, and chooses the user B's video window to play it, then accordingly, client terminal A receives the signal from the user A, realizes the action of playing this smile in the video window of the user B through the network server. The expressions or action animation pictures can be pre-set for the users or defined by the users.

According to certain embodiments, furthermore, users can also send virtual gifts to each other. Each user has an identifier for storing virtual gifts, and also each type of virtual gifts has an identifier. For example, when the user A sees the video image of the user B, and decides to give the user B virtual gifts (suppose his virtual gifts include two types: flowers and drinks, mark OFF for flower and WWW for drink), then the user A initiates a sending animation action in his own window, and initiates a receiving animation in the user B's window (or only initiates an animation action in one window). Accordingly, through the transmission of data, the interactive process of virtual gift sending and receiving can be realized.

According to some embodiments, furthermore, the above-mentioned embodiments demonstrate how to achieve the interaction between video input and network service of virtual network gaming scene. Similarly, the method suggested by the embodiments of present invention can also achieve interaction between audio input and network service of virtual network game. For example, the client terminal collects user's voice, recognizes audio input data, identifies the information the user would like to express, and apply the information onto the virtual game scene, or onto a virtual character in the virtual game scene. For example, client terminal A collects the command 'blink' issued by the user A, obtains the eye blinking movement information through voice recognition, then applies this eye blinking movement to the user A's virtual character a; Another example, client terminal A collects a "forward" command issued by the user A, through voice recognition, obtains the forward movement information, then applies the forward movement to the user A's virtual characters a, and the virtual character a executes the forward move in the virtual game scene.

Various embodiments of the present invention provide a method to realize an interaction between a video input and a virtual network scene. For example, the video input includes, without limitation, data for image and/or voice.

According to some embodiments, the method provided by the embodiments of the present invention can plug in a mosaic video input window to a virtual online game, so as to achieve the interaction between video input and virtual network scene. And the method makes use of facial recognition, movement analysis, object tracking and motion capture techniques to achieve the interaction between users and the virtual network scene based on the video input. The method also encourages interactions among users by using video-animation mixing technique and through video signal.

Certain embodiments of the invention use the virtual network game mentioned above as an example of illustration. The method provided by this invention can also be applied to net meeting and so on, the embodiment of the present invention makes no restriction on the application.

Figure 4:
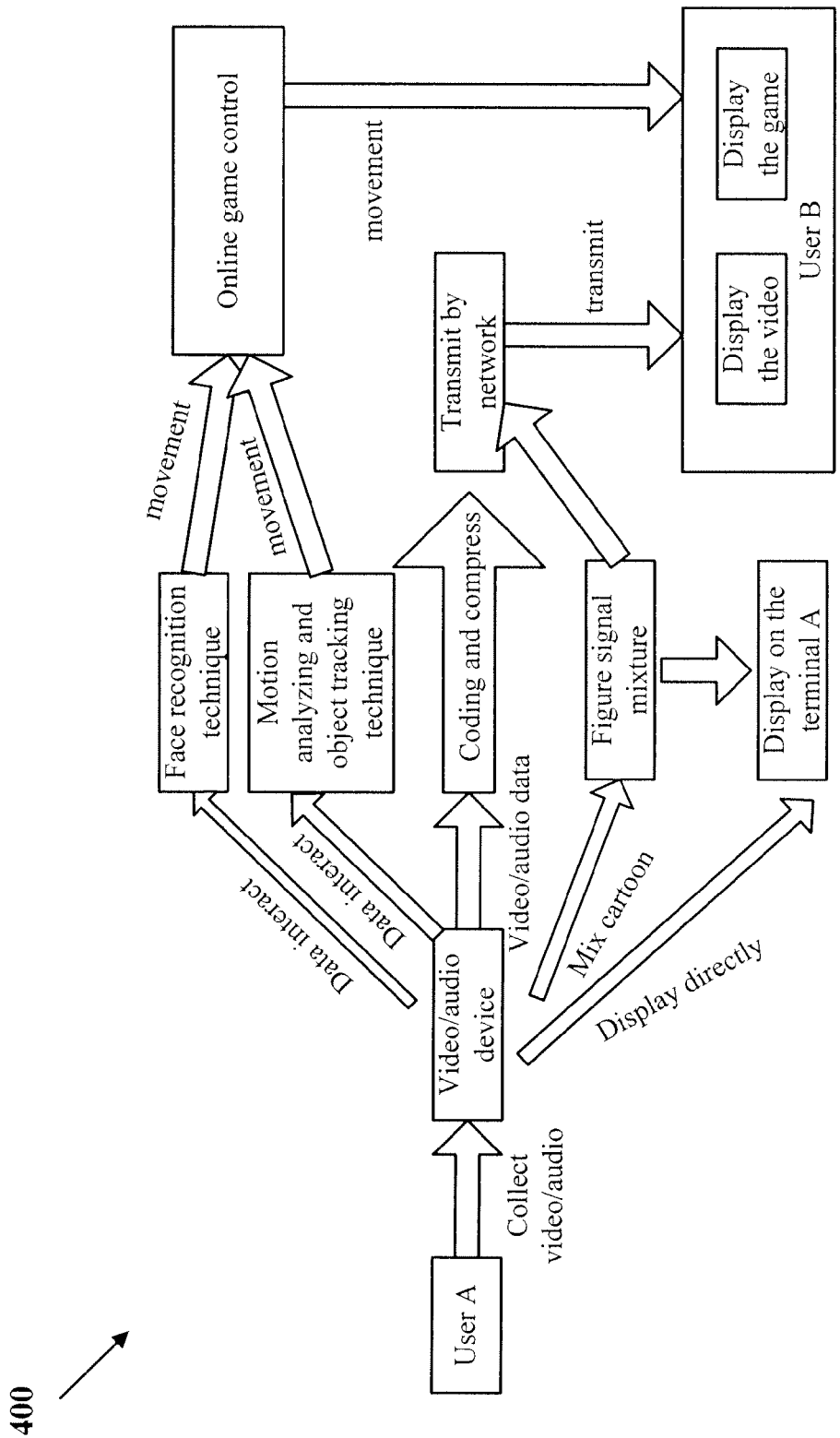
FIG. 4 is a simplified diagram showing a system that implements a method for realizing an interaction between a video input and a virtual network scene according to yet another embodiment of the present invention.

FIG. 4 is a simplified diagram showing a system that implements a method for realizing interaction between video input and virtual network scene according to yet another embodiment of the present invention. This diagram is merely an example, which should not unduly limit the scope of the claims. One of ordinary skill in the art would recognize many variations, alternatives, and modifications.

For example, the system 400 implements the method as shown in FIG. 1 and/or FIG. 3. In another example, the system 400 operates together with other components as shown in FIG. 2. In another example, the facial recognition technique includes, without limitation, the weak feature detection method of Opens for gray-scale images, and/or the Hear feature detection method.

Figure 5:
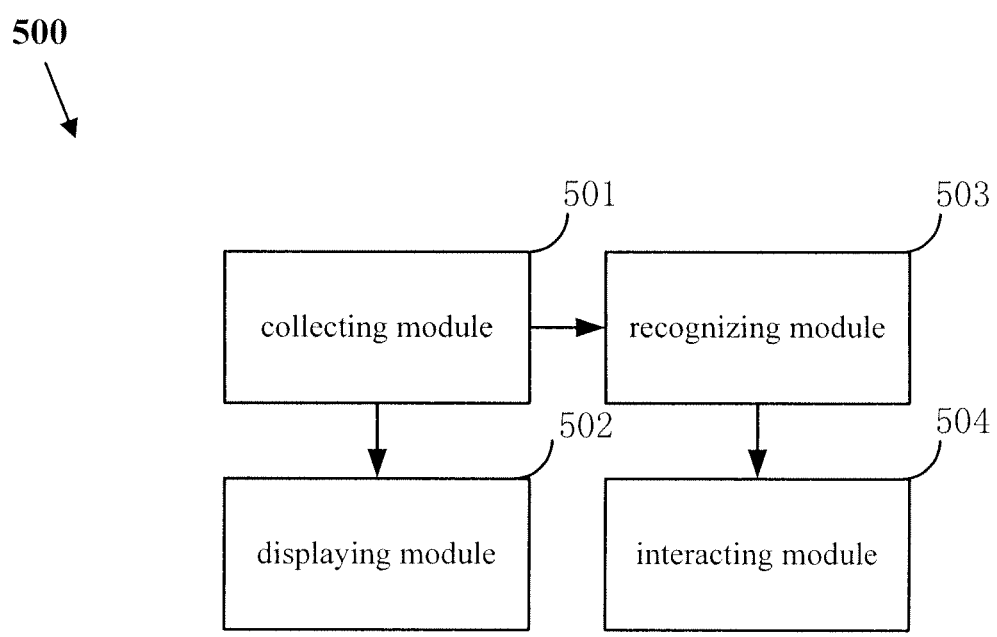
FIG. 5 is a simplified diagram showing a system for realizing an interaction between a video input and a virtual network scene according to yet another embodiment of the present invention.

FIG. 5 is a simplified diagram showing a system for realizing interaction between video input and virtual network scene according to yet another embodiment of the present invention. This diagram is merely an example, which should not unduly limit the scope of the claims. One of ordinary skill in the art would recognize many variations, alternatives, and modifications. For example, the system 500 implements the method as shown in FIG. 1, FIG. 3, and/or FIG. 4. In another example, the system 500 operates together with other components as shown in FIG. 2 and/or FIG. 4.

As shown in FIG. 5, the system 500 is disclosed for realizing an interaction between a video input and a virtual network scene. In one embodiment, the system 500 is configured to collect input video data from a user and to display a video embedded with a virtual network scene on the user's client terminal and/or on other users' client terminals. For example, the video is generated based on the input video data collected from the current user. In another embodiment, the system 500 is configured to collect input video data from a user and to display a virtual network scene and a video on the user's client terminal and/or on other users' client terminals. For example, the video is generated based on the input video data collected from the current user.

As shown in FIG. 5, the system 500 includes a collecting module 501, a displaying module 502, a recognizing module 503, and an interacting module 504. For example, the collecting module 501 is configured to collect input video data from a current user. In another example, the displaying module 502 is configured to display a video on the current user's client terminal and on other users' client terminals, and the video is generated based on the input video data collected from the current user. In yet another example, the recognizing module 503 is configured to extract the movement information for the current user based on the input video data. In yet another example, the interacting module 504 is configured to integrate the movement information of the current user with a virtual network scene and to realize the interaction between video input and the virtual network scene.

In one embodiment, the recognizing module 503 includes a first recognizing unit and/or a second recognizing unit. For example, the first recognizing unit is configured to extract video data for the current user's face from the input video data collected from the current user by using facial recognition technique and to recognize the facial movement of the current user based on the extracted video data for the current user's face. In another embodiment, the second recognizing unit is configured to extract video data for the current user's body from the input video data collected from the current user by using motion analysis and object tracking technique, and to recognize the body movement of the current user based on the extracted video data for the current user's body.

In another embodiment, the interacting module 504 includes a mapping unit and/or a controlling unit. For example, the mapping unit is configured to map the recognized movement of the current user to a virtual character corresponding to the current user. In one embodiment, the mapping process is performed based on the relationship between the movement of the current user and the movement of the virtual character corresponding to the current user. In another example, the controlling unit is configured to determine the virtual network scene based on the movement information of the current user.

In yet another embodiment, the system 500 also includes a first judging and feedback module, a second judging and feedback module, and/or a third judging and feedback module. For example, the first judging and feedback module is configured to, at a predetermined time, check to determine whether the captured input video data satisfy a predetermined condition. If the predetermined condition is satisfied, the first judging and feedback module is further configured to provide the current user with a positive feedback, and if the predetermined condition is not satisfied, the first judging and feedback module is further configured to offer the current user with a negative feedback.

In another example, the second judging and feedback module is configured to determine the time period during which the video data for the current user's face is captured based on the extracted video data for the current user's face, and provide the current user with a positive feedback or a negative feedback based on the determined time period. In yet another example, the third judging and feedback module is configured to determine a value that corresponds to a predetermined characteristic, based on the extracted input video data for the current user's face, and provide the current user with a positive feedback or a negative feedback based on the determined value.

In yet another embodiment, the system 500 includes a receiving module and a selecting module. For example, the receiving module is configured to receive a signal sent by the current user for adding a virtual object. In another example, the selecting module is configured to select the virtual object based on the signal. Additionally, the displaying module 502 is also configured to display the selected virtual object on the current user's client terminal and on other users' client terminals, and/or to change the position of the virtual object with the change in the position of the current user's face.

In yet another embodiment, the system 500 further includes a screenshot module and/or a comparison module. For example, the screenshot module is configured to receive a screenshot triggering signal from the current user and in response to the trigger signal, taking at least two screenshots for at least two videos associated with at least two users respectively. In one embodiment, the two videos are displayed at the first terminal. In another embodiment, the two screenshots including information associated with two faces of the two users respectively. In another example, the comparison module is configured to determine the matching degree between the two screenshots and return the determined matching degree to the current user.

As discussed above and further emphasized here, FIG. 5 is merely an example, which should not unduly limit the scope of the claims. One of ordinary skill in the art would recognize many variations, alternatives, and modifications. For example, the modules 501, 502, 503, and 504 are located in the same device such as in a client terminal. In another example, the modules 501 and 502 are located in a client terminal, and the modules 503 and 504 are located in a network server. In yet another example, the modules 501, 502, 503, and 504 can be combined into one module, or each can be split into more than one module.

According to yet another embodiment, a system is provided to realize an interaction between a video input and a virtual network scene. For example, the system can plug a mosaic video input window into a virtual online game, so as to achieve the interaction between the video input and virtual network scene, and to make use of facial recognition, movement analysis, object tracking and/or motion capture techniques to achieve the interaction between one or more users and the virtual network scene based on the video input. In another example, the system also encourages interactions among users, by using a video-animation mixing technique and through video signals as shown in FIG. 4.

Figure 6:
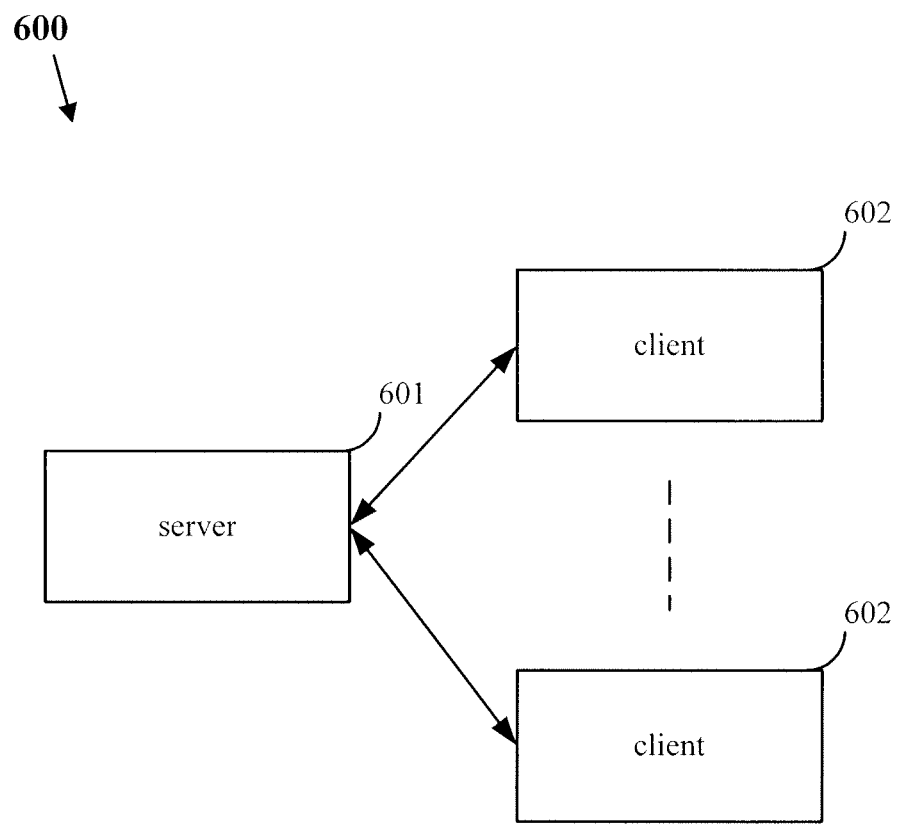
FIG. 6 is a simplified diagram showing a system for realizing interaction between video input and virtual network scene according to yet another embodiment of the present invention.

FIG. 6 is a simplified diagram showing a system for realizing interaction between video input and virtual network scene according to yet another embodiment of the present invention. This diagram is merely an example, which should not unduly limit the scope of the claims. One of ordinary skill in the art would recognize many variations, alternatives, and modifications. For example, the system 600 implements the method as shown in FIG. 1, FIG. 3, and/or FIG. 4. In another example, the system 600 operates together with other components as shown in FIG. 2, FIG. 4, and/or FIG. 5.

As shown in FIG. 6, the system 600 includes a server 601 and client terminals 602. For example, the client terminals 602 is configured to collect input video data from a current user, and to display a video on the current user's client terminal and on other users' client terminals based on the input video data collected from the current user. In another example, the client terminals 602 is further configured to recognize the movement information of the current user based on the input video data and integrate the movement information of the current user with a virtual network scene, in order to realize the interaction between video input and virtual network scene. In yet another example, the server 601, such as the network server s shown in FIG. 2, is configured to transmit the video data from one client terminal to one or more other client terminals, and/or transmit the control information to control the virtual network scene.

According to certain embodiments, a person skilled in the art easily knows that video data can be transmitted by the server or P2P (Peer to Peer).

According to some embodiments, preferably, video data and virtual network data can be transmitted separately.

According to certain embodiments, considering the actual network environment, in order to enhance the efficiency of the network transmission, save the bandwidth of the network transmission, the system includes: a plurality of client terminals including a first client terminal and a second client terminal, video server and virtual network scene server, wherein:

For example, the client terminal is configured to receive input video data for a first user at the first client terminal; send information associated with the input video data through the server to at least the second client terminal; extract movement information for the first user based on the input video data; and integrate the movement information with a virtual network scene; and display a video on or embedded with the virtual network scene at the first client terminal; wherein the second client terminal is at least configured to display the video on or embedded with the virtual network scene at the second client terminal.

In another example, the video server is configured to receive input video data from client terminal, transmit information associated with the input video data from the first client terminal to the second terminal, receive movement information from client terminals, integrate the movement information with virtual network scene, to realize the interaction between video input and virtual network scene.

In yet another example, the virtual network scene server is configured to execute the process of the virtual network scene, integrate the movement information with virtual network scene, to realize the interaction between video input and virtual network scene, wherein when the virtual network scene is online game, the virtual network scene server is game server.

According to some embodiments, aiming at the popular P2P network, the system also includes:

(1) Client terminal configured to receive input video data for a first user at the first client terminal; send information associated with the input video data through the server to at least the second client terminal; extract movement information for the first user based on the input video data; and integrate the movement information with a virtual network scene; and display a video on or embedded with the virtual network scene at the first client terminal; wherein the second client terminal is at least configured to display the video on or embedded with the virtual network scene at the second client terminal.

(2) Video server, configured to receive input video data from client terminal, transmit information associated with the input video data from the first client terminal to the second terminal, receive movement information from client terminals, integrate the movement information with virtual network scene, to realize the interaction between video input and virtual network scene.

(3) Virtual network scene server, configured to execute the process of the virtual network scene, integrate the movement information with virtual network scene, to realize the interaction between video input and virtual network scene, wherein when the virtual network scene is online game, the virtual network scene server is game server; and (4) P2P server, configured to backup the data for the video server and/or the virtual network scene server, so as to realize disaster recovery and backup data.

According to some embodiments, the present invention discloses a computer program product including a computer readable medium including instructions for realizing an interaction between a video input and a virtual network scene, the computer readable medium comprising: one or more instructions for receiving input video data for a first user at a first terminal; one or more instructions for sending information associated with the input video data through a network to at least a second terminal; one or more instructions for processing information associated with the input video data; and one or more instructions for displaying a video on or embedded with a virtual network scene at least the first terminal and the second terminal; wherein the video is generated based on at least information associated with the input video data.

For example, wherein the computer-readable storage medium further comprising: one or more instructions for receiving input video data for a first user at a first terminal; one or more instructions for extracting movement information for the first user based on the input video data; one or more instructions for integrating the movement information with the virtual network scene in order to realize an interaction between the input video data and the virtual network scene.

According to certain embodiments, the computer-readable storage medium further comprising: one or more instructions for extracting first video data associated with a face of the first user from the input video data; one or more instructions for recognizing at least a facial movement for the first user based on at least information associated with the first video data; one or more instructions for extracting second video data associated with a body of the first user from the input video data; and one or more instructions for recognizing at least a body movement for the first user based on at least information associated with the second video data.

According to some embodiments, the computer-readable storage medium further comprising: one or more instructions for mapping the movement information for the first user to a virtual character corresponding to the first user based on at least information associated with a mapping relationship between the movement information for the first user and the corresponding virtual character; and/or one or more instructions for determining the virtual network scene based on at least information associated with the movement information for the first user.

Certain embodiments of the present invention provides a system to realize the interaction between video input and virtual network scene, the system provided by the embodiments of the present invention can plug in a mosaic video input window to a virtual network scene so as to achieve the interaction between video input and virtual network scene, and the makes use of facial recognition, movement analysis, object tracking and motion capture techniques to achieve the interaction between users and the virtual network scene based on the video input, The method also encourages interactions among users by using video-animation mixing technique and through video signal.

Some embodiments of the present invention provide methods, apparatus, and systems for realizing interactions between video inputs and virtual network scenes, related to computer network technologies. For example, the method includes collecting input video data from current user, displaying video on the current user's client terminal and on other users' client terminals, recognizing the movement information of the current user based on the input video data, and integrating the movement information of current user with virtual network scene, in order to realize the interaction between video input and virtual network scene. In another example, the video is generated based on the input video data collected from the current user.

Certain embodiments of the present invention improve relevancy between the video input and the network service of virtual on-line game, realize the interaction between the video input and the network service mentioned above, and/or enhance the user experience.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for realizing an interaction between a video input and a virtual network scene, the method comprising:
   receiving a first signal from a first user for adding a first virtual object;
   selecting the first virtual object based on at least information associated with the first signal;
   capturing first input video data of the first user at a first terminal by using a first video capturing device;
   recognizing a first movement associated with the first user based on at least information associated with the first input video data;
   receiving a second signal from a second user for adding a second virtual object;
   selecting the second virtual object based on at least information associated with the second signal;
   capturing second input video data of the second user at a second terminal by using a second video capturing device;
   recognizing a second movement associated with the second user based on at least information associated with the second input video data;
   displaying, in a first display region of a first output device of the first terminal, a first virtual character, a second virtual character, and a first virtual network scene, the first virtual character representing the first user, the second virtual character representing the second user, wherein the process for displaying, in a first display region of a first output device of the first terminal, a first virtual character, a second virtual character, and a first virtual network scene includes:
      changing a first character position of the first virtual character in response to the first movement associated with the first user;
      changing a second character position of the second virtual character in response to the second movement associated with the second user; and
      determining the first virtual network scene based on at least information associated with the first movement associated with the first user and the second movement associated with the second user;
   displaying, in a second display region of the first output device of the first terminal, the first input video data, the second input video data, the first virtual object, and the second virtual object, the second display region being different from the first display region, wherein the process for displaying, in a second display region of the first output device of the first terminal, the first input video data, the second input video data, the first virtual object, and the second virtual object includes:
      changing a first object position of the first virtual object in response to the first movement associated with the first user; and
      changing a second object position of the second virtual object in response to the second movement associated with the second user;
   displaying, in a third display region of a second output device of the second terminal, the first virtual character, the second virtual character, and a second virtual network scene, the second virtual network scene being determined based on at least information associated with the first movement associated with the first user and the second movement associated with the second user;
   displaying, in a fourth display region of the second output device of the second terminal, the first input video data, the second input video data, the first virtual object, and the second virtual object, the fourth display region being different from the third display region;
   in response to a trigger signal, taking a first screenshot of the first user based on at least information associated with the first input video data;
   in response to the trigger signal, taking a second screenshot of the second user based on at least information associated with the second input video data, the second user being different from the first user;
   determining a matching degree between the first screenshot and the second screenshot;
   obtaining a plurality of images for the face of the first user from the first input video data within a predetermined time period;
   processing information associated with the plurality of images for the face of the first user;
   determining a value for the plurality of images using at least a predetermined characteristic; and
   providing the first user with a positive feedback or a negative feedback based on at least information associated with the time period and the determined value.

2. The method of claim 1, wherein the process for displaying, in a first display region of a first output device of the first terminal, a first virtual character, a second virtual character, and a first virtual network scene includes:
   extracting first movement information from the first movement associated with the first user;
   extracting second movement information from the second movement associated with the second user; and
   integrating the first movement information and the second movement information with the first virtual network scene.

3. The method of claim 2 wherein the process for extracting first movement information includes:
   extracting third video data associated with a face of the first user from the first input video data;
   recognizing at least a facial movement for the first user based on at least information associated with the third video data;
   extracting fourth video data associated with a body of the first user from the first input video data; and
   recognizing at least a body movement for the first user based on at least info anon associated with the fourth video data.

4. The method of claim 2 wherein the process for extracting first movement information includes:
   extracting third video data associated with a face of the first user from the first input video data; and
   recognizing at least a facial movement for the first user based on at least information associated with the third video data.

5. The method of claim 2 wherein the process for extracting first movement information includes:
   extracting third video data associated with a body of the first user from the first input video data; and
   recognizing at least a body movement for the first user based on at least information associated with the third video data.

6. The method of claim 1 wherein the process for changing a first character position of the first virtual character includes mapping the first movement associated with the first user to the first virtual character based on at least information associated with a mapping relationship between the first movement and the first virtual character.

7. The method of claim 1 wherein the process for providing the first user with a positive feedback or a negative feedback includes:
   providing the first user with the positive feedback if the determined value satisfies a predetermined condition; and
   providing the first user with the negative feedback if the determined value does not satisfy the predetermined condition.

8. The method of claim 7 wherein:
   the process for providing the first user with the positive feedback includes providing the first user with one or more rewards; and
   the process for providing the first user with the negative feedback includes providing the first user with one or more penalties.

* * * * *